United States Patent
Minnick et al.

(10) Patent No.: US 6,347,033 B1
(45) Date of Patent: Feb. 12, 2002

(54) THIXOTROPIC DIELECTRIC FLUID FOR CAPACITORS

(75) Inventors: Michael G. Minnick, Fort Wayne, IN (US); Patricia C. Irwin, Altamont; Clive W. Reed, Scotia, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/702,386

(22) Filed: Oct. 31, 2000

Related U.S. Application Data

(62) Division of application No. 09/085,525, filed on May 26, 1998, now Pat. No. 6,177,031.

(51) Int. Cl.$^7$ .............................. H01G 4/04; H01B 3/24
(52) U.S. Cl. ......................... 361/327; 252/570; 252/572
(58) Field of Search .................................. 361/314–319, 361/326, 327; 252/570, 572, 579

(56) References Cited

U.S. PATENT DOCUMENTS

| | | | |
|---|---|---|---|
| 3,912,986 A | 10/1975 | Favata et al. | 317/242 |
| 3,996,505 A | 12/1976 | Lapp et al. | 317/259 |
| 4,327,395 A | 4/1982 | Yagitani et al. | 361/326 |
| 4,530,782 A | 7/1985 | Meyer | 252/578 |
| 4,543,207 A | 9/1985 | Sato et al. | 252/570 |
| 4,584,129 A | 4/1986 | Katayama | 252/570 |
| 4,633,367 A | 12/1986 | Strange et al. | 361/272 |
| 4,656,558 A | 4/1987 | Bentley | 361/327 |
| 4,756,851 A | 7/1988 | Billigmeier et al. | 252/572 |
| 4,787,010 A | 11/1988 | Bentley | 361/315 |
| 4,870,540 A | 9/1989 | Solar | 361/327 |
| 4,879,628 A | 11/1989 | Goetz | 361/327 |
| 4,931,843 A | 6/1990 | Goetz | 361/323 |
| 5,349,493 A | 9/1994 | Winsor, IV | 361/301.5 |
| 5,949,017 A * | 9/1999 | Oommen et al. | 174/17 LF |
| 6,177,031 B1 * | 1/2001 | Minnick et al. | 252/570 |

FOREIGN PATENT DOCUMENTS

| | | | |
|---|---|---|---|
| EP | 02069912 | 8/1990 | |
| GB | 1492745 | 11/1977 | 3/20 |
| GB | 2256437 A | 12/1992 | 4/22 |

* cited by examiner

*Primary Examiner*—Anthony Dinkins
*Assistant Examiner*—Eric W. Thomas
(74) *Attorney, Agent, or Firm*—Welsh & Katz, Ltd.; Damian G. Wasserbauer

(57) ABSTRACT

A thixotropic dielectric fluid that includes vegetable oil, transformer oil, and a clay material. The thixotropic dielectric fluid is particularly suited for use in a capacitor.

13 Claims, No Drawings

THIXOTROPIC DIELECTRIC FLUID FOR CAPACITORS

CROSS REFERENCE TO RELATED APPLICATIONS

This application is a division of patent application Ser. No. 09/085,525, filed on May 26, 1998, issued as U.S. Pat. No. 6,177,031 on Jan. 23, 2001.

FIELD OF THE INVENTION

The present invention relates to a dielectric fluid for use in electrical devices. More particularly, the present invention relates to a dielectric fluid for electrical capacitors.

BACKGROUND OF THE INVENTION

Electrical capacitors are used in a variety of applications. Capacitors are generally referred to as large capacitors and small capacitors. Large capacitors include high voltage (greater than 600 volts AC) and low voltage power capacitors, induction heating capacitors, and power factor correction capacitors. Small capacitors are typically found in application categories, such as motor start and run capacitors and lighting capacitors.

One common configuration for electrical capacitors includes a spiral-wound configuration with a pair of capacitor roll sections. Each of the capacitor roll sections is typically a strip of polypropylene having an aluminum or zinc coating. Suitable electrical leads are attached to the spiral-wound roll using conventionally known techniques. The spiral-wound roll is then placed in a casing and the casing is filled with a capacitor fluid.

The capacitor fluids should have a high dielectric constant, maintain a low dissipation factor, and be compatible with other materials in the capacitor. The capacitor fluids must also withstand elevated and fluctuating temperature, pressure, and voltage stress conditions to provide the capacitor with a long operative life.

The capacitor fluid should also be relatively viscous to minimize loss of the capacitor fluid from the capacitor if the casing of the capacitor develops a leak. Additionally, components used in fabricating the capacitor fluid should be biodegradable to minimize environmental damage if the capacitor fluid leaks from the capacitor.

Cichanowski, U.S. Pat. No. 4,388,669, which is assigned to the assignee of the present application, describes polypropylene glycol dielectric fluids. The polypropylene glycol dielectric fluids exhibit high clearability by virtue of low carbon to hydrogen ratio and high weight percentage of molecular oxygen. The polypropylene glycol dielectric fluids also display low swelling effect on the polypropylene film and minimal penetration into the capacitor roll. One drawback of the polypropylene glycol dielectric fluid is that it can leak from a breached capacitor because the polypropylene glycol dielectric fluids possess only moderate viscosities in the range of 500 centipoise.

Bentley, U.S. Pat. No. 4,656,558, discloses a dielectric liquid containing polybutene with an average molecular weight of at least 800. Bentley, U.S. Pat. No. 4,787,010, describes forming a dielectric material from a mixture of polybutene and polyethylene. Bentley '010 indicates that the dielectric material is semi-solid to prevent the dielectric material from escaping from a capacitor in which the dielectric material is used. Using dielectric materials formed from polybutene present problems in obtaining desirable clearance results because polybutene lacks molecular oxygen.

SUMMARY OF THE INVENTION

A dielectric fluid for use in a capacitor. The dielectric fluid contains a mixture of vegetable oil, transformer oil, and a clay material. The dielectric fluid exhibits a thixotropic index of greater than 20. Advantageously, the dielectric fluid exhibits a dielectric strength of greater than 32 kilovolts. The dielectric fluid also exhibits minimal degradation of components when used in a capacitor.

DETAILED DESCRIPTION OF THE INVENTION

While the present invention is susceptible of embodiments in various forms, there is shown in the drawings and will hereinafter be described presently preferred embodiments with the understanding that the present disclosure is to be considered an exemplification of the invention and is not intended to limit the invention to the specific embodiments illustrated.

A dielectric fluid produced according to the present invention generally includes a mixture of vegetable oil, transformer oil, and a clay material. The present invention also relates to a capacitor that includes a casing, a capacitor roll, and dielectric fluid produced according to the present invention.

The dielectric fluid exhibits a high thixotropic index, which enables the capacitor to be readily filled with the dielectric fluid and minimizes the potential for leakage of the dielectric fluid from the capacitor. As used herein, the term thixotropic index is a ratio of the dielectric fluid viscosity at a low shear rate to dielectric fluid viscosity at a high shear rate.

The dielectric fluid exhibits high clearability because of the fluid's low carbon to hydrogen ratio and the high weight percentage of molecular oxygen. The dielectric fluid of the present invention has a low swelling effect on polypropylene film and thereby minimizes capacitance losses due to fluid interaction. Additionally, the dielectric fluid has minimal penetration into the capacitor roll because of the dielectric material's high surface tension.

The vegetable oil is a low viscosity, hydrocarbon-based oil. The vegetable oil is selected with a high temperature and pressure stability. The vegetable oil is also selected to be substantially inert with respect to the other components in which the dielectric fluid is used. For example, the vegetable oil does not react with the polypropylene film used in fabricating the other portions of the capacitor.

The vegetable oil is preferably soybean oil. A preferred vegetable oil may be obtained from Hunt-Wesson, Inc. of Fullerton, Calif. However, a person of ordinary skill in the art will appreciate that it is possible to use one or more other vegetable-based oils alone or in conjunction with soybean oil without departing from the present invention.

The concentration of the vegetable oil in the mixture is between about 40 and 85 percent and desirably between about 40 and 60 percent. Preferably, the concentration of the vegetable oil in the mixture is approximately 50 percent. As used herein, all references to percent are percent by weight unless indicated otherwise.

The transformer oil is preferably an insulating mineral oil. The transformer oil is selected with a high temperature and pressure stability. While the transformer oil is typically more aggressive towards the other components in the capacitor than the vegetable oil, the transformer oil is selected to minimize degradation of the other components in which the dielectric fluid is used.

A preferred light mineral insulating oil may be obtained from Exxon Corporation of Houston, Tex., under the designation UNIVOLT 60 mineral oil. A person of ordinary skill in the art will appreciate that it is possible to use one or more other mineral oils in conjunction with light mineral insulating oil without departing from the present invention.

The concentration of the transformer oil in the mixture is between about 15 and 60 percent and desirably between about 40 and 50 percent. Preferably, the concentration of the transformer oil in the mixture is approximately 48.5 percent.

The clay material is incorporated into the mixture to raise the viscosity of the mixture. The clay material is preferably in the form of a finely divided powder. Depending on the clay material selected, it may be necessary to use an activator in conjunction with the clay material to produce a desired level of viscosity enhancement.

A suitable clay material for use in the present invention is montmorillonite clay. A preferred montmorillonite clay is marketed under the designation CLAYTONE 40 by Southern Clay Products, Inc., of Gonzales, Tex. Another suitable clay material for use in the present invention is bentonite clay. A preferred bentonite clay is marketed under the designation BENTONE 1000 by RHEOX, Inc., of Hightstown, N.J.

The concentration of the clay material in the mixture is up to about 6 percent and desirably between about 2 and 5 percent. Preferably, the concentration of the clay material in the mixture is approximately 3 percent.

An activator is preferably used in conjunction with the montmorillonite clay. The activator enhances the dispersion of the clay material in the mixture of vegetable oil and transformer oil. The activator also reduces settling of the clay material in the capacitor fluid. It is believed that the activator produces these results by binding to the surface of the clay material.

A suitable activator for use with the present invention is polyethylene-polypropylene copolymer. A preferred polyethylene-polypropylene copolymer is marketed under the designation PLURONIC 31R1 block copolymer surfactant by BASF Corporation of Parsippany, N.J. Another suitable activator for use in the present invention is a tetrafunctional block copolymer of poly-oxypropylene/oxyethylene, based on ethylene diamine, which is marketed under the designation TETRONIC 150R1 by BASF Corporation of Parsippany, N.J.

Yet another activator for use in the present invention is propylene carbonate, which is marketed by Arco Chemical Company of Newtown Square, Pa., under the designation ARCONATE 1000.

The concentration of the activator used in formulating the dielectric fluid of the present invention is up to 3 percent. The concentration of the activator is preferably selected based on the concentration of the clay material. A ratio of the clay material to activator is preferably between 3:1 and 6:1. A preferred concentration of the activator in the dielectric fluid is approximately 0.5 percent.

The dielectric fluid is preferably prepared by mixing the transformer oil, the clay material, and the activator, if used. To ensure a homogenous mixture is produced, the mixing is continued for approximately 1 hour. Vegetable oil is then added to the mixture and mixing is continued for an additional hour.

The dielectric fluid exhibits a thixotropic index of at least 20 and desirably between about 20 and 500. Preferably, the thixotropic index is between about 50 and 200. As noted above, the thixotropic index is a ratio of the dielectric fluid viscosity at a low shear rate to the dielectric fluid viscosity at a high shear rate.

For purposes of demonstration, the low shear rate viscosity is preferably obtained using a spindle rotation rate of approximately 0.6 revolutions per minute. The viscosity is preferably measured in a Brookfield viscometer. The high shear rate viscosity is preferably obtained using a spindle rotation rate of approximately 60 revolutions per minute.

The low shear rate viscosity is typically at least 500 centipoise and desirably at least 10,000 centipoise. Preferably, the low shear rate viscosity is between about 15,000 centipoise and 75,000 centipoise. The high shear rate viscosity is typically less than 500 centipoise. Preferably, the high shear rate viscosity is between about 100 centipoise and 500 centipoise.

Because the dielectric fluid exhibits a high thixotropic index, the dielectric fluid readily flows into the capacitor and fills the voids between the capacitor roll sections. The high thixotropic index of the dielectric fluid also reduces the potential for leakage of the dielectric fluid from the capacitor because the dielectric fluid exhibits a high viscosity once placed in the capacitor.

EXAMPLE 1

A thixotropic dielectric fluid was prepared from vegetable oil, transformer oil, montmorillonite clay, and activator. The transformer oil (UNIVOLT 60, Exxon Corp.) was mixed with montmorillonite clay (CLAYTONE 40, Southern Clay Products, Inc.) and activator (PLURONIC P123, BASF Corp.) at respective concentrations 93 percent, 6 percent, and 1 percent. The mixture was blended for approximately 1 hour to produce a substantially homogeneous mixture.

The mixture was then mixed with an approximately equal amount of soybean oil (Hunt-Wesson, Inc.) and then blended for approximately 1 hour to produce a substantially homogeneous dielectric fluid.

The high temperature stability of the dielectric fluid was evaluated in conjunction with zinc coated polypropylene capacitor film. The performance was compared with the performance of polypropylene glycol dielectric fluid and polybutene dielectric fluid. The polybutene dielectric fluid was marketed by Amoco of Chicago, Ill., under the designation INDOPOL H-300.

The physical characteristics of the dielectric materials are set forth in Table 1. The dielectric strength of the dielectric fluids was analyzed pursuant to ATSM D877.

TABLE 1

|  | Present Invention | Polypropylene Glycol | Polybutene |
|---|---|---|---|
| Dielectric Strength, kV |  |  |  |
| Average | 30.4 | 36.5 | 28.3 |
| Standard Deviation | 2.7 | 1.8 | 0.9 |
| Viscosity, Brookfield, cP |  |  |  |
| 60 RPM | 402 | 500 | 62,000 |
| 6 RPM | 2,090 | 500 | 62,000 |
| 0.6 RPM | 16,000 | 500 | 62,000 |

The dielectric fluid of the present invention was predried in a vacuum to a moisture content of approximately 290 parts per million. The polypropylene glycol dielectric material was also predried in a vacuum. The polybutene dielectric fluid was obtained from a capacitor manufactured by Aerovox, Inc. of New Beford, Mass. and had a moisture content of approximately 1,500 parts per million.

Approximately 24 inch long strips of zinc coated polypropylene capacitor film (Toray 05AEHA0296 (ZN) 75.0× 2.57.500) were placed in 2 ounce glass jars along with approximately 25 grams of each dielectric fluid. Additional sample jars were also prepared in which the dielectric fluid was just soybean oil (Hunt-Wesson, Inc.) or transformer oil (UNIVOLT 60, Exxon Corp.). The jars were then sealed with foil-lined lids.

The sample jars were maintained at a temperature of approximately 117° C. for approximately 74 hours. The sample jars were then allowed to cool to room temperature in a dessicator. The capacitor film in each sample jar was then evaluated for weight gain or loss and retention of zinc coating. The results of the evaluation are reported in Table 2.

TABLE 2

| | Initial Weight (g) | Final Weight (g) | ppm H20 before | ppm H2O after | Weight change |
|---|---|---|---|---|---|
| Present Invention | 0.286 | 0.930 | 426 | 798 | 325% |
| Polypropylene Glycol | 0.293 | 0.447 | 90 | 1,270 | 153% |
| Polybutene | 0.291 | 0.347 | >450 | 648 | 119% |
| Vegetable oil | 0.292 | 0.489 | 70 | 702 | 168% |
| Transformer Oil | 0.292 | 0.344 | 58 | 34 | 118% |

EXAMPLE 2

Another thixotropic dielectric fluid was prepared from vegetable oil, transformer oil, montmorillonite clay, and activator. The transformer oil (UNIVOLT 60, Exxon Corp.) was mixed with montmorillonite clay (BENTONE 1000, Rheox, Inc.) and activator (TETRONIC 150R1, BASF Corp.) at the following concentrations 92 percent, 6 percent, and 2 percent, respectively. The mixture was blended for approximately 1 hour to produce a substantially homogeneous mixture.

The mixture was then mixed with an approximately equal amount of soybean oil (Hunt-Wesson, Inc.) and then blended for approximately 1 hour to produce a substantially homogeneous dielectric fluid.

The thixotropic characteristics of the dielectric fluid were analyzed using a Brookfield Viscometer with a #2 spindle. The viscosity at 60, 6 and 0.6 revolutions per minute are 115, 325, and 1,625 centipoise, respectively. The average dielectric strength of the dielectric fluid was 32.828 kilovolts with a standard deviation of 1.819 kilovolts.

EXAMPLE 3

Yet another thixotropic dielectric fluid was prepared from vegetable oil, transformer oil, montmorillonite clay, and activator. The transformer oil (UNIVOLT 60, Exxon Corp.) was mixed with montmorillonite clay (BENTONE 1000, Rheox, Inc.) and propylene carbonate activator (ARCONATE 1000, Arco Chemical Co.) at the following concentrations 92 percent, 6 percent, and 2 percent, respectively. The mixture was blended for approximately 1 hour to produce a substantially homogeneous mixture.

The mixture was then mixed with an approximately equal amount of soybean oil (Hunt-Wesson. Inc.) and then blended for approximately 1 hour to produce a substantially homogeneous dielectric fluid.

The thixotropic characteristics of the dielectric fluid were analyzed using a Brookfield Viscometer with a #4 spindle for the 60 revolution per minute test and a #2 spindle for the 6 and 0.6 revolutions per minute tests. The viscosity at 60, 6 and 0.6 revolutions per minute are 860, 3,885, and 31,800 centipoise, respectively. The average dielectric strength of the dielectric fluid was 5.551 kilovolts with a standard deviation of 1.030 kilovolts.

EXAMPLE 4

The performance dielectric fluid performance test set forth in Example 1 and reported in Table 3 was repeated using a different zinc coated polypropylene capacitor film (Bolmet ZMPPHE 2.5M Lot M3797-117#4). The results of the tests are reported in Table 3.

TABLE 3

| | Initial Weight (g) | Final Weight (g) | ppm H20 before | ppm H2O after | Weight change |
|---|---|---|---|---|---|
| Present Invention | 0.286 | 0.974 | 426 | 903 | 263% |
| Polypropylene Glycol | 0.293 | 0.519 | 90 | 1,283 | 142% |
| Polybutene | 0.291 | 0.480 | >450 | 2,000 | 128% |
| Vegetable oil | 0.292 | 0.875 | 70 | 634 | 239% |
| Transformer Oil | 0.292 | 0.405 | 58 | 29 | 113% |

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A power capacitor comprising:

a casing;

a capacitor roll; and a dielectric fluid, wherein the capacitor roll and the dielectric fluid are placed in the casing, and wherein the dielectric fluid exhibits a thixotropic index of at least 20.

2. The power capacitor of claim 1, wherein the dielectric fluid has a dielectric strength of at least about 32 kilovolts.

3. A power capacitor as in claim 1, wherein the dielectric fluid comprises vegetable oil, mineral oil, and clay material.

4. The dielectric fluid of claim 3 wherein the clay material is montmorillonite clay, bentonite clay, or combinations thereof.

5. The dielectric fluid of claim 3, further comprising an activator.

6. The dielectric fluid of claim 5, wherein the activator is polyethylene-polypropylene copolymer, tetrafunctional block copolymer of polyoxypropylene/oxyethylene, propylene carbonate, or combinations thereof.

7. The dielectric fluid of claim 5, wherein the activator has a concentration of up to about 3 percent by weight.

8. The dielectric fluid of claim 5, wherein a ratio of the clay material to the activator is between about 6:1 and 3:1.

9. A dielectric fluid for use in a capacitor having a positive electrode and a negative electrode comprising:

vegetable oil sufficient to provide clearability to the dielectric fluid;

mineral oil sufficient to provide effective resistance to moisture absorption; and clay material in a sufficient amount so as to substantially restrain leakage of the dielectric fluid from the capacitor, wherein the dielectric fluid maintains a sufficiently high dielectric constant to electrically insulate the positive electrode of the capacitor from the negative electrode of the capacitor.

10. The dielectric fluid of claim 9 wherein the dielectric fluid has a thixotropic index of at least about 14.

11. The dielectric fluid of claim 9 wherein the dielectric fluid has a thixotropic index of at least about 20.

12. A method of providing a power capacitor, which comprises the step of: using a dielectric fluid comprising a vegetable oil, a mineral oil and a clay material as the dielectric material for the capacitor.

13. The method of claim 12, wherein the clay material is present in a sufficient amount so as to substantially restrain leakage of the dielectric fluid from the capacitor.

* * * * *